United States Patent [19]

Kanda et al.

[11] Patent Number: 4,510,810

[45] Date of Patent: Apr. 16, 1985

[54] ULTRASONIC MICROSCOPE

[75] Inventors: Hiroshi Kanda, Tokorozawa; Isao Ishikawa, Hino, both of Japan

[73] Assignee: Hitachi, Ltd., Tokyo, Japan

[21] Appl. No.: 454,026

[22] Filed: Dec. 28, 1982

[30] Foreign Application Priority Data

Jan. 14, 1982 [JP] Japan .................................. 57-3449

[51] Int. Cl.³ ............................................. G01N 29/04
[52] U.S. Cl. ........................................ 73/606; 73/619; 73/621; 73/626; 73/642
[58] Field of Search ............... 73/607, 606, 609, 610, 73/620, 626, DIG. 7, 621, 642; 367/11, 13; 128/660

[56] References Cited

U.S. PATENT DOCUMENTS

| | | | |
|---|---|---|---|
| 3,480,002 | 11/1969 | Flaherty et al. | 73/621 |
| 3,555,888 | 1/1971 | Brown | 73/621 |
| 3,624,744 | 11/1971 | Munger | 73/620 X |
| 4,078,435 | 3/1978 | Kossoff et al. | 73/621 |
| 4,138,895 | 2/1979 | Mezrich | 73/642 |
| 4,252,024 | 2/1981 | Hurwitz | 73/607 X |
| 4,319,489 | 3/1982 | Yamaguchi et al. | 73/626 |
| 4,378,699 | 4/1983 | Wickramasirge | 73/606 |
| 4,394,824 | 7/1983 | Kanda et al. | 73/606 |
| 4,398,539 | 8/1983 | Proudian | 73/626 |

Primary Examiner—Howard A. Birmiel
Attorney, Agent, or Firm—Antonelli, Terry & Wands

[57] ABSTRACT

An ultrasonic microscope displays an ultrasonic wave image of a sample relatively and two-dimensionally scanned with respect to an ultrasonic wave beam transmitted from and focused by a transducer including a piezoelectric element and an acoustic lens. The F number of the acoustic lens is variably changeable while the scan in one direction of the two-dimensional scan is substituted by a time axis scan of the received echo.

4 Claims, 7 Drawing Figures

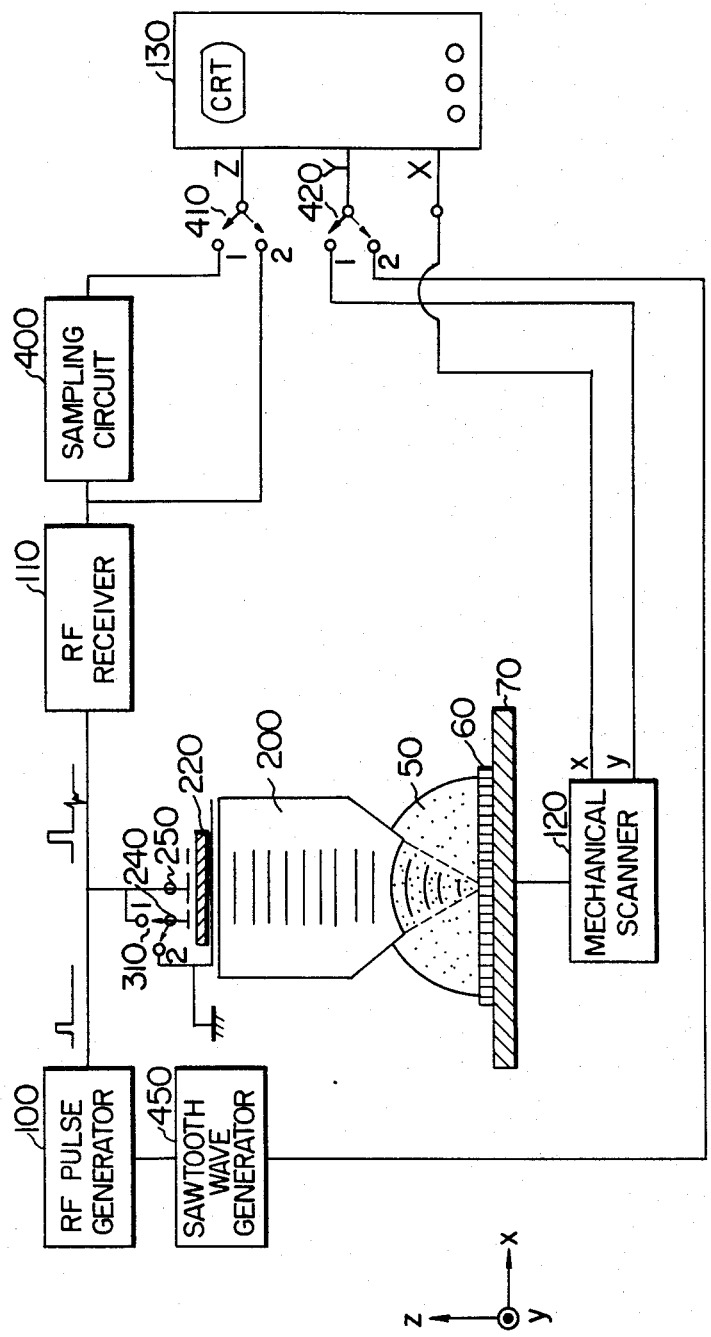
F I G. 5

ULTRASONIC MICROSCOPE

The present invention relates to an ultrasonic microscope, and more particularly to an ultrasonic microscope in which a plurality of imaging modes are available.

An ultrasonic wave which has been used in a medical field in those years as an effective wave to observe an internal structure of a human body has a nature of transmitting through an optically transparent object, which nature is not attainable by a light ray or an electron beam. The higher a frequency of the ultrasonic wave is, the finer object can be drawn or imaged. In addition, since information carried by the ultrasonic wave includes mechanical properties of the object such as elasticity, density and viscosity, an internal structure which cannot be observed by the light ray or the electron beam can be observed.

An ultrasonic microscope using an ultrasonic wave having a sound wave frequency of 1 GHz and hence a sound wavelength in water of approximately 1 $\mu$m has been proposed. (See R. A. Lemon and C. F. Quetz "A scanning Acoustic Microscope", IEEE Cat. No. 73 CH14829SU, pages 423–426.) A principle of the proposed ultrasonic microscope is to mechanically and two-dimensionally scan the surface of a sample by an ultrasonic beam converged to approximately 1 $\mu$m diameter, collect disturbance of the ultrasonic wave caused by the sample such as scattering, reflection or transmittance attenuation, convert it to an electric signal and two-dimensionally display the electric signal on a CRT in synchronism with the mechanical scan to produce a microscopic image.

FIG. 1 shows a basic construction of the prior art ultrasonic microscope. A transducer for generating and detecting an ultrasonic wave mainly comprises a thin piezoelectric film 20 and an acoustic lens 40. The lens crystal 40 (for example, cylindrical crystal of sapphire or quartz glass) has one end surface 41 which is an optically polished plane and the other end which has a concave spherical surface 42 of a small radius of curvature (for example 0.1–1 mm) formed therein. An electric signal output from an RF pulse generator 100 is applied across a structure comprising an upper electrode 10, the piezoelectric film 20 and a lower electrode 11, which are formed on the end surface 41 of the lens 40 by evaporation or other technique. Thus, a plane wave RF pulse ultrasonic wave 80 is radiated into the lens crystal 40 by a piezoelectric effect of the piezoelectric film 20. The plane ultrasonic wave is focused onto a sample 60 placed on a predetermined focal plane by a positive acoustic spherical lens which is formed by an interface between the concave spherical surface 42 and a medium 50 (which is usually pure water).

The ultrasonic wave reflected by the sample 60 is condensed by the positive acoustic spherical lens and converted to a plane ultrasonic wave, which propagates through the lens crystal 40 and is finally convertd to an RF pulse electric signal by an inverse piezoelectric effect of the piezoelectric film 20. The RF pulse electric signal is amplified and detected by an RF receiver 110 and converted to a video signal (1–10 MHz) which is then used as a luminance signal (input Z) of a CRT 130.

The sample 60 mounted on a sample stage 70 is two-dimensionally and mechanically vibrated or moved by an x-y plane two-dimensional mechanical scanner 120 and the video signal is displayed on the CRT 130 in synchronism with the two-dimensional scan so that a microscopic image is produced.

The prior art ultrasonic microscope of this type depicts a sample plane (x-y plane) which is orthogonal to the direction of propagation of the ultrasonic wave (direction z in FIG. 1). This imaging system is called a C-scope in the art. If a wafer or a chip of a semiconductor device which is one of the objects to be imaged by the ultrasonic microscope is observed by this system, a so-called in-plane pattern may be observed.

In recent years, the semiconductor device has a multi-layer structure on a silicon substrate and hence a need to non-destructively observe a section of the multi-layer structure orthogonal to the in-plane pattern has been increased. It is thus necessary to depict a sample section (for example x-z plane) in a plane which contains the propagation direction of the ultrasonic wave. In the art of a medical diagnostic apparatus, this imaging system (called a B-scope) is mainly used. In this system, a reflected waveform is used to depict the z-axis direction and the ultrasonic beam is mechanically or electrically scanned to depict the x or y-direction. Thus, if the B-scope imaging system is applicable to the ultrasonic microscope, the sectional structure can be depicted and the function of the microscope will be significantly enhanced. In addition, if the C-scope and the B-scope can be selectively switched in the same apparatus, it will be very useful.

It is an object of the present invention to provide an ultrasonic microscope in which a plurality of imaging modes (B-scope and C-scope) are available.

According to the present invention, there is provided an ultrasonic microscope comprising transducer means including a piezoelectric element and an acoustic lens for transmitting an ultrasonic wave beam to a sample and receiving a reflected echo of the transmitted ultrasonic wave beam from said sample, means for providing a relative two-dimensional mechanical scan between said sample and the ultrasonic wave beam focused by said acoustic lens, means for displaying an ultrasonic wave image of said sample on the basis of the reflected echo from said sample in synchronism with said two-dimensional scan, and means for substituting the scan in one direction of said two-dimensional scan by a time axis scan of the reflected echo received by said transducer.

The present invention will be apparent from the following detailed description taken in conjunction with the accompanying drawings, in which:

FIG. 5 schematically shows an ultrasonic microscope according to an embodiment of the present invention.

Figure 1:
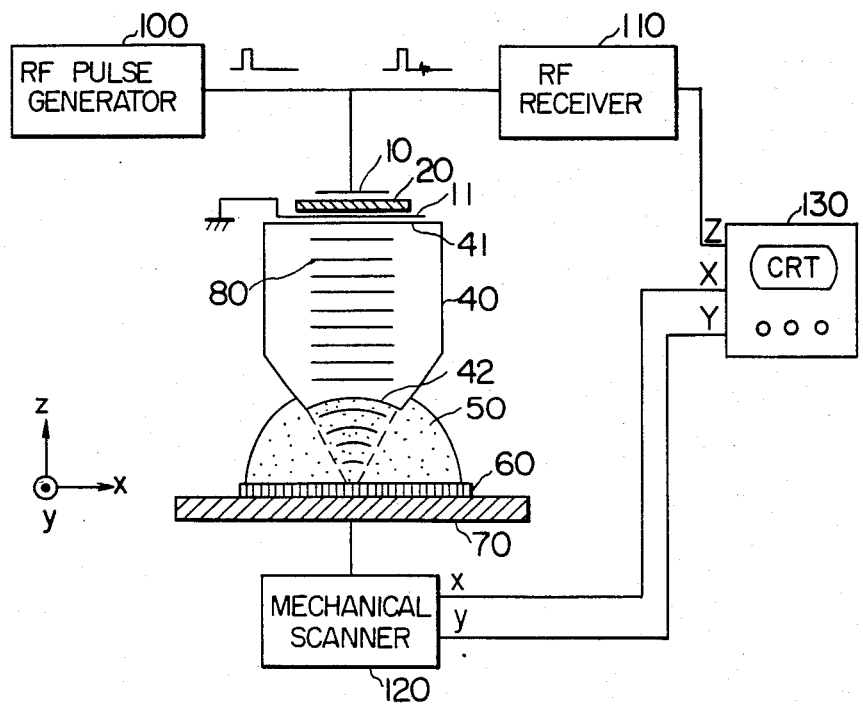
FIG. 1 shows a basic construction of a prior art ultrasonic microscope.
Figure 2A:
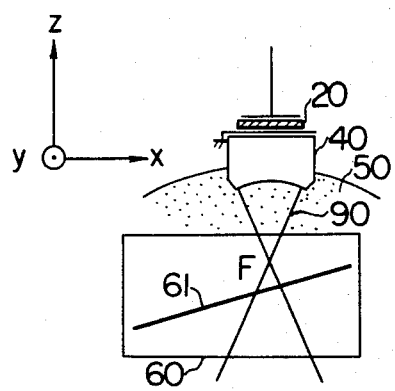
FIG. 2A to 2C show an example in which the B-scope imaging scheme is simply applied to an ultrasonic microscope.
Figure 2B:
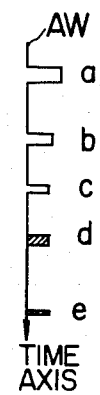
Figure 2C:
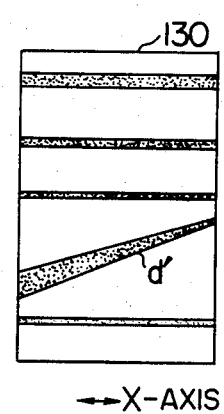

FIGS. 2A to 2C show an example in which the B-scope imaging scheme is simply applied to an ultrasonic microscope. In FIG. 2A, there is shown an ultrasonic wave beam 90 generated by an acoustic lens 40 when an RF pulse electric signal of a repetition frequency $t_R$ is applied to a thin piezoelectric film 20. For a purpose of explanation, a sample 60 comprises a medium of a uniform acoustic impedance having a wire 61 or different acoustic impedance embedded therein. When the lens 40 is at the illustrated position, a reflected echo waveform from the sample 60 is shown in FIG. 2B as an A-scope waveform AW. In the waveform AW, a shows a waveform emitted by the RF generator, b shows an echo from an interface of the lens 40 and the medium 50, c shows an echo from an interface of the surface of the sample 60 and the medium 50, d shows a reflected echo from the wire 61 in the sample 60, and e shows an echo from a back surface of the sample 60. A vertical axis (Y-axis) of a CRT 130 represents a time axis of a repetition time $t_R$ and a horizontal axis (X-axis) represents an X-axis of the lens 40. Thus, when the lens 40 is moved in the X-axis direction and the A-scope waveform AW is used as a luminance signal (Z-input) of the CRT 130, an image shown in FIG. 2C is depicted. Thus, the B-scope can be attained and the wire 61 in the sample 60 can be observed as shown by d'.

Resolution of such an apparatus includes a depth resolution $\Delta\rho$ in the propagation direction of the ultrasonic wave (depth of focus) and an azimuth resolution $\Delta\gamma$ in a plane orthogonal to the propagation direction of the ultrasonic wave. They are determined by a wavelength $\lambda$ of the ultrasonic wave used and an F number which represents a lens brightness, as shown below.

$$\Delta\gamma = \lambda F \tag{1}$$

$$\Delta\rho = 2\lambda F^2 \tag{2}$$

In the prior art C-scope imaging system, it has been desired to reduce $\Delta\gamma$ and $\Delta\rho$ as much as possible, that is, a high azimuth resolution and a shallow depth of focus. In practice, when a lens of F number of 0.7 and an ultrasonic wave of 1 GHz is used, $\Delta\gamma$ is approximately 1 $\mu$m and $\Delta\rho$ is approximately 1.5 $\mu$m in water (1500 m/s). On the other hand, in the B-scope imaging system in which the A-scope waveform or echo signal is used for display, it is desired to use an ultrasonic wave beam whose width is as uniform as possible. The reason is because though a selected echo of very short duration is produced at a focal point F if the depth of focus is too shallow as shown in FIG. 2A, a beam width abruptly increases with the increased deviation of the beam from the focal point and hence the duration of the reflected echo increases due to the overlapping of echoes from all areas of the wire to which the wide beam strikes. In FIG. 2C, the B-scope image d' of the wire 61 displayed on the CRT 130 is drawn thicker on the left hand and narrower on the right hand to represent the above situation. The azimuth resolution is very low at points other than the focal point. Thus, it is apparent that an acceptable sectional view in the x-z plane cannot be drawn. Namely, the construction of the C-scope and the construction of the B-scope are generally not compatible.

Thus, the present inventors have found a fact that an acceptable sectional view cannot be obtained in such a manner that the B-scope imaging scheme used in the medical diagnostic apparatus is simply applied to the prior art ultrasonic microscope construction.

In view of the above, the present invention includes switching the depth of focus depending on the imaging scheme of the C-scope or the B-scope. This will be discussed below.

It is apparent from the above discussion that a shallow depth of focus is desirable to the C-scope while a deep depth of focus is desirable to the B-scope. From the equation (2), the depth of focus is given by $$\Delta\rho = 2\lambda F^2 \tag{3}$$

For a purpose of discussion, let us assume that an integrated circuit chip having a multi-layer structure of a thickness of 15 $\mu$m formed on a silicon substrate, is an object to be imaged. For the C-scope, it is required to move a focal point depthwise of the sample little by little starting from a surface of the sample using a transducer of $\Delta\rho = 1.5$ $\mu$m, thereby producing an in-plane sliced image of the multi-layer structure. In this case, approximately ten separate sliced images are produced. On the other hand, for the B-scope, it is necessary to use a transducer of $\Delta\rho \simeq 15$ $\mu$m due to the fact described above.

From the equation (3), it is seen that the depth of focus can be deepened when the frequency is low. Thus, one approach may be to selectively use a high frequency sensor (for example 1 GHz, $\Delta\rho = 1.5$ $\mu$m) and a low frequency sensor (for example 100 MHz, $\Delta\rho = 15$ $\mu$m). However, this approach is not advisable because it requires two sensors and results in the reduction of the azimuth resolution from 1 $\mu$m to 10 $\mu$m. This is due to the fact that a factor of the wavelength $\lambda$ contributes in the form of degree 1 in both the equations (1) and (3).

The present inventors have noticed that a factor of the F number is the form of degree 1 for the azimuth resolution while it is the form of degree 2 for the depth resolution. Thus, in the present invention, the ultrasonic wave frequency is fixed and only the F number is changed to switch the depth of focus.

If the F number of a sensor ($\Delta\gamma = 1$ $\mu$m, $\Delta\rho = 1.5$ $\mu$m) having the F number of 0.7 at 1 GHz can be changed to 2.2, then $\Delta\gamma = 3.3$ $\mu$m and $\Delta\rho = 15$ $\mu$m are attained.

Figure 3:
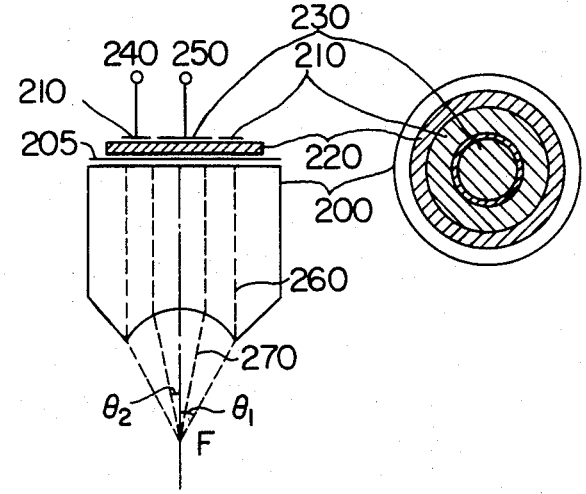
FIG. 3 shows the structure of a transducer which can be used in an ultrasonic microscope of the present invention.

In other word, according to the present invention, the depth of focus can be deepened without significantly lowering the azimuth resolution. One example of a transducer which can be used in an ultrasonic microscope of the present invention is shown in FIG. 3. A lower electrode 205 is evaporated on one end surface of a lens 200 and a thin piezoelectric film 220 such as ZnO is evaporated thereon. Two concentric upper electrodes 230 and 210 are formed thereon as shown in FIG. 3 and electric input terminals 240 and 250 are connected thereto. When an RF electric pulse signal is applied simultaneously to both the terminals 240 and 250, a plane ultrasonic wave pulse having a width 260 is generated and it is focused to a focal point F. An angle $\theta_1$ of a lens diameter as viewed from the focal point F determines the F number, which is given by $$F \simeq \tfrac{1}{2} \sin \theta_1 \tag{4}$$

When the F number is equal to 0.7, $\theta_1$ is approximately equal to 45°. If the RF electric signal is applied only to the terminal 250, only a portion of the piezoelectric film 220 sandwiched by the upper electrode 230 and the lower electrode 205 vibrates so that a plane ultrasonic wave pulse having a width 270 is generated and it is also focused to the focal point F. The F number is given by $$F \simeq \tfrac{1}{2} \sin \theta_2 \tag{5}$$

Figure 4:
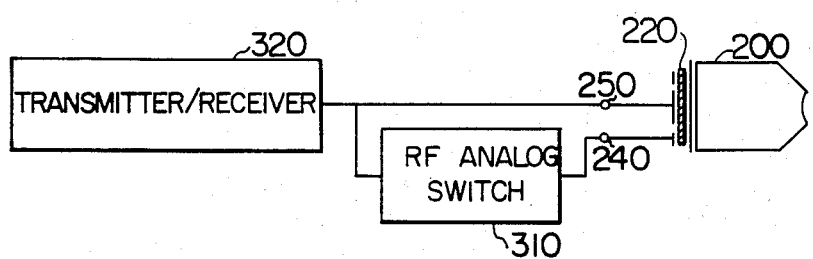
FIG. 4 shows a block diagram of electrical parts connected to the transducer of FIG. 3.

If $\theta_2 = 13°$, then $F = 2.2$. Accordingly, in this transducer, for the C-scope imaging, both the terminals 250 and 240 are used to transmit and receive the ultrasonic wave so that the imaging system of F=0.7 is attained, and for the B-scope imaging, only the terminal 250 is used to transmit and receive the ultrasonic wave so that the imaging system of F=2.2 is attained. The switching can be readily attained by inserting an RF analog switch 310 between the terminal 240 of the transducer and an ultrasonic wave transmitter/receiver 320 (comprising an RF pulse generator and an RF receiver), as shown in FIG. 4, and turning on and off the RF analog switch 310.

While one transducer is used in the above example, two transducers may be exchangeably used depending on the application of the C-scope and the B-scope. For example, if a first transducer of 1 GHz and F =0.7 is used for the C-scope, the azimuth resolution $\Delta\gamma$ is 1 $\mu$m and the depth resolution is 15 $\mu$m, and if a second transducer of 1 GHz and F=2.2 is used for the B-scope, the depth resolution $\Delta\rho$ is 1.5 $\mu$m. If the transducer of FIG. 3 is provided with a continuous structure of the electrodes 230 and 210, it may be used as the first transducer. If the transducer of FIG. 3 is provided with only the electrode 230, it may be used as the second transducer.

FIG. 5 shows an ultrasonic microscope according to an embodiment of the present invention. In the C-scope mode, switches 310, 410 and 420 are at positions 1. The reflected echo is received by an RF receiver 110 and a video signal thereof is sampled by a sampling circuit 400 for supply to an Z-input of a CRT 130. A mechanical scanner 120 mechanically vibrates two-dimensionally in x-y directions a sample table 70 having a sample 60 mounted thereon, and x and y displacements of the sample table 70 are supplied to X and Y-inputs of the CRT 130.

In the B-scope mode, a sawtooth wave generator 450 is triggered by a RF pulse generator 100 and an output of the sawtooth wave generator 450 is used in place of the y-displacement of the sample table 70 and the video output of the RF receiver 110 is supplied to the Z-input. To this end, the switches 310, 410 and 420 are switched to positions 2. By ganging those switches, an operator can select the C-scope mode or the B-scope mode in one operation.

In the above embodiment, the mechanical two-dimentional vibration or displacement has been applied to the sample. Alternatively, a transmitted ultrasonic wave beam may be mechanically and two-dimensionally scanned.

As described hereinabove, according to the present invention, the use of the B-scope is permitted as a new imaging approach of the ultrasonic microscope so that not only the surface pattern of the sample but also the sectional view thereof can be drawn. Accordingly, the present invention greatly contributes to the industry.

What is claimed is:

1. An ultrasonic microscope comprising:
   a single transducer for generating an ultrasonic beam to be focused at a single focal point and for detecting a reflected echo of said ultrasonic beam, said single transducer including an acoustic lens having opposite surfaces, one of said surfaces being a spherical surface and the other of said surfaces being a planar surface, and a thin piezoelectric film formed on said planar surface of said acoustic lens;
   driving means for driving said transducer;
   receiving means for receiving the echo detected in said transducer;
   scanning means for two-dimensionally scanning a relative position of a sample with respect to said ultrasonic beam at least in a plane normal to a direction of travel of said ultrasonic beam;
   display means for selectively displaying a first image obtained by scanning an output of said receiving means in synchronism with the two-dimensional scan by said scanning means, and a second image obtained by scanning the output of said receiving means in synchronism with a time axis scan of a received signal and a scan synchronized with the scan in one direction of said two-dimensional scan, said first image being an ultrasonic image of said sample in a plane parallel to said plane, and said second image being an ultrasonic image of a cross-section of said sample normal to said plane; and
   switching means for changing over an effective aperture of said transducer so that a first effective aperture is provided when the display of said first image is selected, sand a second effective aperture is provided with the display of said second image is selected, said first effective aperture being larger than said second effective aperture.

2. An ultrasonic microscope according to claim 1, wherein said driving means is a common driving means for driving said transducer for enabling the display of said first image and for enabling the display of said second image.

3. An ultrasonic microscope according to claim 1, wherein said receiving means is a common receiving means for receiving the echo detected in said transducer for enabling the display of said first image and for enabling the display of said second image.

4. An ultrasonic microscope according to claim 1, wherein said switching means includes a plurality of electrodes concentrically arranged on said single transducer and means for controlling the energization of all or at least a selected one of said electrodes so as to change said effective aperture of said single transducer.

* * * * *